United States Patent [19]
Lagier

[11] Patent Number: 5,299,837
[45] Date of Patent: Apr. 5, 1994

[54] DEVICE FOR ARTICULATELY INTERCONNECTING MEMBERS OF AN EXHAUST LINE, IN PARTICULAR OF AN AUTOMOBILE VEHICLE

[75] Inventor: Jean Lagier, Arcey, France

[73] Assignee: ECIA-Equipements et Composants Pour L'Industrie Automobile, Audincourt, France

[21] Appl. No.: 978,832

[22] Filed: Nov. 19, 1992

[30] Foreign Application Priority Data

Nov. 22, 1991 [FR] France .................. 91 14432

[51] Int. Cl.⁵ ............................................. F16L 55/02
[52] U.S. Cl. .................................. 285/49; 285/114; 285/226; 285/299
[58] Field of Search .............. 285/49, 114, 226, 299

[56] References Cited

U.S. PATENT DOCUMENTS

| | | | |
|---|---|---|---|
| 2,898,940 | 8/1959 | Cole | 285/114 X |
| 3,232,640 | 2/1966 | Donkle | 285/114 X |
| 3,527,481 | 9/1970 | Lewis | 285/114 |

FOREIGN PATENT DOCUMENTS

| | | | |
|---|---|---|---|
| 951355 | 7/1974 | Canada | 285/114 |
| 432436 | 9/1991 | European Pat. Off. . | |
| 8521900 | 10/1988 | Fed. Rep. of Germany . | |
| 2418333 | 9/1979 | France . | |
| 2645939 | 10/1990 | France . | |
| 594220 | 11/1947 | United Kingdom | 285/49 |

*Primary Examiner*—Dave W. Arola
*Attorney, Agent, or Firm*—Sughrue, Mion, Zinn, Macpeak & Seas

[57] ABSTRACT

Device for articulately interconnecting members of an exhaust line, in particular of an automobile vehicle wherein the device comprises at least one flexible conduit element (1) interposed between the members (2,3) of the exhaust line, and damping means (4,5) for damping the relative displacement of the ends of the flexible conduit element and therefore of the members of the line, evenly arranged about the flexible conduit element (1) and interposed between fastening elements (6,7) fixed on each side of the flexible conduit element, and is characterized in that each damping means (4,5) comprises at least one coil of metallic cable.

13 Claims, 2 Drawing Sheets

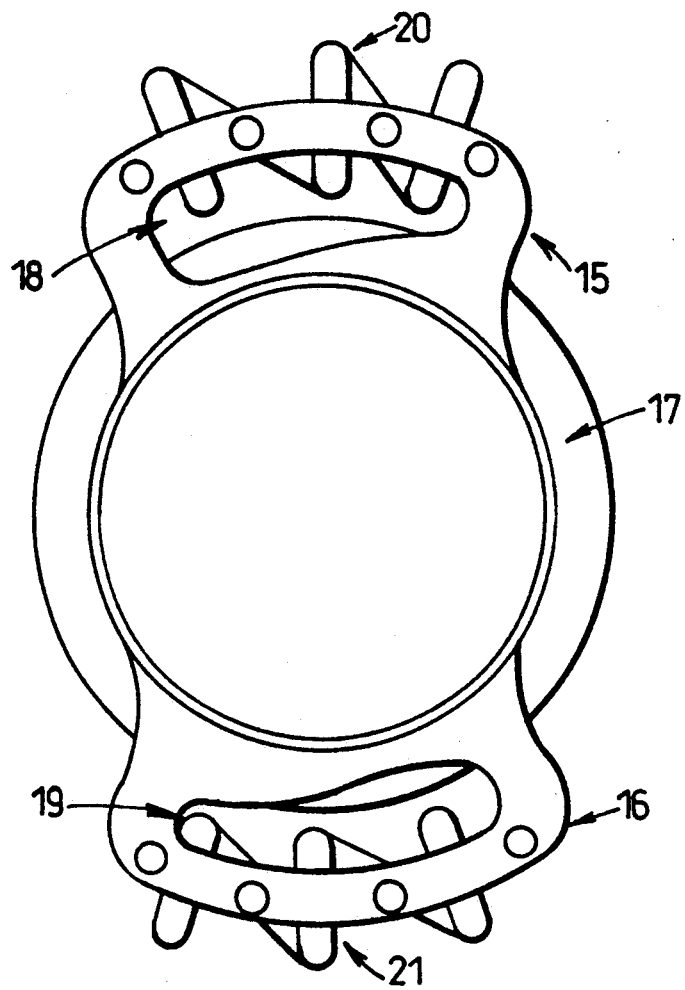
FIG·2
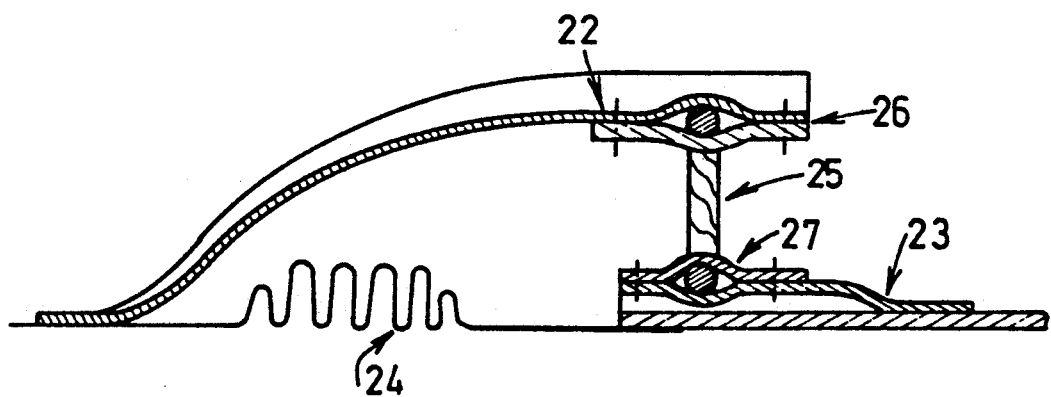
FIG·3

DEVICE FOR ARTICULATELY INTERCONNECTING MEMBERS OF AN EXHAUST LINE, IN PARTICULAR OF AN AUTOMOBILE VEHICLE

BACKGROUND OF THE INVENTION

The present invention relates to a device for articulately interconnecting members of an exhaust line, in particular of an automobile vehicle.

Such devices are employed in the exhaust lines of automobile vehicles to permit relatively large movements between the engine of the vehicle and the exhaust line of the latter.

It is indeed known that when starting up or upon relatively sudden variations in the load on the engine, the latter has a tendency to move with respect to the rest of the structure of the vehicle and consequently with respect to the exhaust line in that the latter is fixed to the structure of the vehicle.

A number of devices known under the name of line decoupling devices have been developed in the prior art to permit overcoming the problems related to these movements and to prolong the life of the exhaust line.

Thus, devices have been developed for articulately interconnecting the members of an exhaust line, in particular of an automobile vehicle, which comprise at least one flexible conduit element interposed between the members of the exhaust line, and means for damping the relative displacement of the ends of the flexible conduit element and therefore of the members of the line, evenly arranged about the flexible conduit element and interposed between fastening elements fixed on each side of the flexible conduit element.

Such devices are for example disclosed in the documents DE-OS-2 838 990 and FR-A-2 531 914.

In the first of the aforementioned documents, the fastening elements are formed by connecting flanges which are disposed at the connecting ends of a rolled pipe, have bolts extending therethrough and are elastically connected by means of the latter through a spring element constituting a damper.

In the second of the aforementioned documents, support elements connected to the ends of the flexible conduit element constitute pockets similar to housings and are movable relative to each other, and damping cushions of compressed metallic wire are disposed in the pockets so as to form elements damping the displacement.

However, the devices described in these documents are not fully satisfactory.

Indeed, the use of spring elements does not permit decoupling in a satisfactory manner the engine from the exhaust line, so that vibrations of the engine may be transmitted to this line and result in noise and premature wear of the line.

The device disclosed in the second document has a relatively complex structure and is of relatively high cost.

SUMMARY OF THE INVENTION

An object of the invention is therefore to overcome these problems by providing a device which is simple, reliable, of reduced size and is relatively cheap to manufacture.

The invention therefore provides a device for articulately interconnecting members of an exhaust line, in particular of an automobile vehicle, of the type comprising at least one flexible conduit element interposed between the members of the line, and means for damping the relative displacement of the ends of the flexible conduit element and therefore of the members of the line, evenly arranged about the flexible conduit element and interposed between fastening elements fixed on each side of the flexible conduit element, characterized in that each damping means comprises at least one coil of a metallic cable.

A better understanding of the invention will be had from the following description which is given solely by way of example with reference to the accompanying drawings, in which:

BRIEF DESCRIPTION OF THE DRAWINGS

FIG. 2 is a diagrammatic end elevational view of a second embodiment of a device according to the invention, and FIG. 3 is a diagrammatic sectional view of a third embodiment of a device according to the invention.

Figure 1:
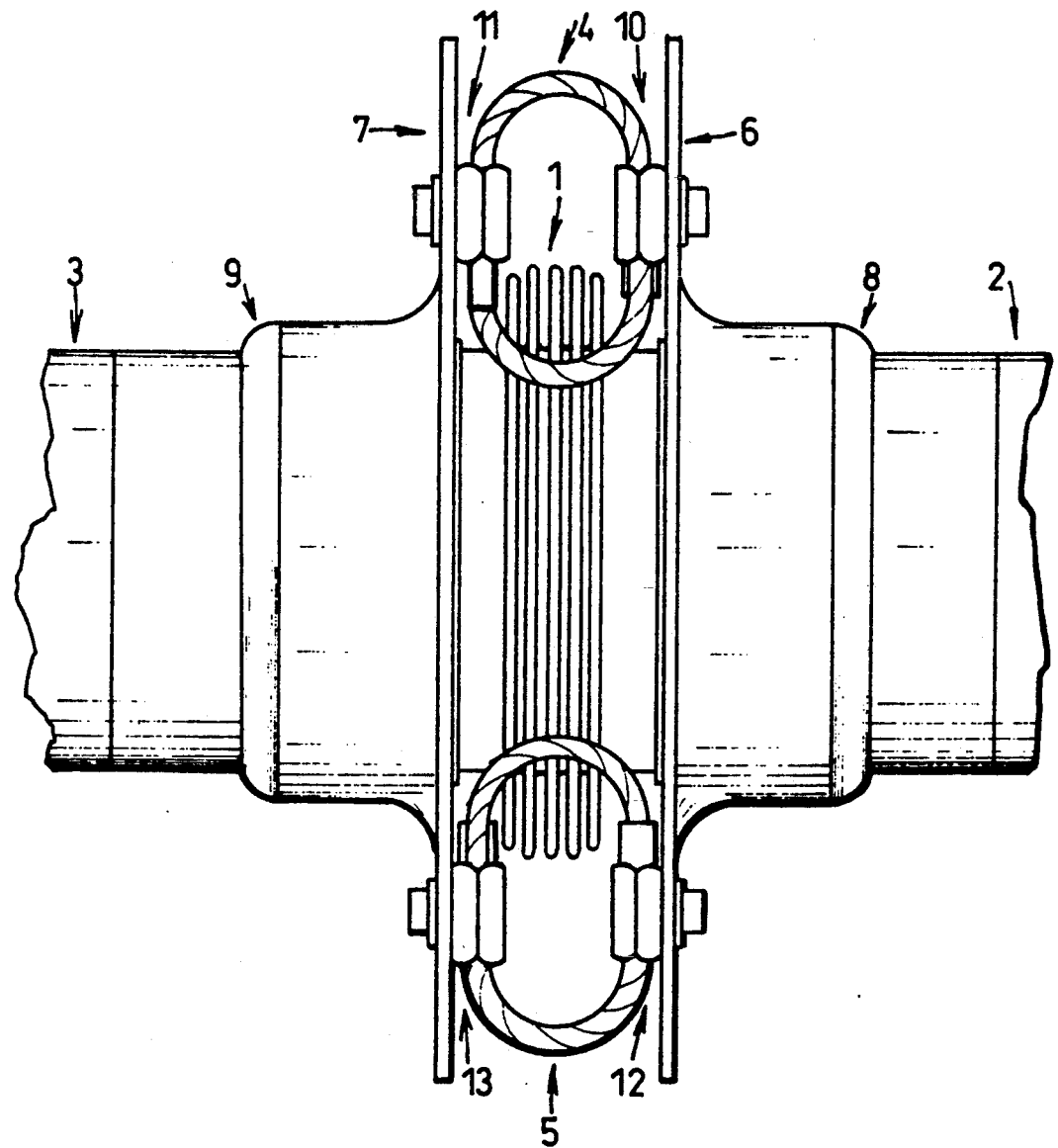
FIG. 1 is a diagrammatic side elevational view of a first embodiment of a device according to the invention.

As can be seen in FIG. 1, a device according to the invention permits articulately interconnecting members of an exhaust line, in particular of an automobile vehicle, and comprises at least one flexible conduit element generally designated by the reference character 1, this flexible conduit element being interposed between the members, for example 2 and 3, of the exhaust line.

In the illustrated embodiment, these members 2 and 3 are formed by exhaust pipe portions, one of which is connected to the engine of the vehicle whereas the other is connected to the rest of the exhaust line.

Further, means for damping the relative displacement of the ends of the flexible conduit element, and therefore of the members of the line, are evenly arranged or distributed about the flexible conduit element 1 and are generally designated by the reference characters 4 and 5.

These damping means are interposed between fastening elements fixed on each side of the flexible conduit element.

In the embodiment illustrated in FIG. 1, these fastening elements are designated by the reference characters 6 and 7 and are formed by fastening flanges fixed at 8 and 9 respectively to the ends of the flexible conduit element, for example by welding.

These flanges may have any suitable shape and permit the fastening of the damping means evenly arranged about the flexible conduit element.

For example, these flanges may be square, rectangular or have other shapes.

According to the invention, each damping means 4 or 5 comprises at least one coil of a metallic cable interposed between the fastening elements and fixed to the latter by for example clamps 10, 11, 12 and 13 respectively.

It will be understood that a plurality of coils of metallic cable may also be employed.

In the embodiment illustrated in FIG. 1, the device for example comprises four damping means disposed in pairs on each side of the flexible conduit element and each formed by a plurality of coils of metallic cable.

Other embodiments may of course be envisaged, such as that shown in FIG. 2 in which the fastening elements are constituted by laterally projecting parts 15 and 16 extending from the ends of the flexible conduit element 17, these laterally projecting parts defining an opening 18 and 19 respectively.

In this embodiment, a damping means 20 or 21 is disposed on each side of the flexible conduit element and comprises a plurality of coils of metallic cable extending between the confronting laterally projecting parts.

While in the two embodiments shown in FIGS. 1 and 2 the fastening elements extend in confronting relation to each other in general directions substantially perpendicular to the axis of the flexible conduit element, in the embodiment shown in FIG. 3, the fastening elements 22 and 23 extend one over the other in general directions substantially parallel to the axis of the flexible conduit element 24.

In this embodiment, each damping means evenly arranged about the flexible conduit element also comprises at least one coil of metallic cable generally designated by the reference character 25 in FIG. 3 and fixed to the fastening elements by clamps 26 and 27.

It will therefore be understood that the device according to the invention is an extremely simple structure cheap to manufacture and has a relatively small size.

As the damping of the displacements is achieved by means of a coil of metallic cable, the latter also provides an effective decoupling of the two members of the exhaust line and avoids the transmission of vibrations along the latter.

What is claimed is:

1. Device for articulately interconnecting members of an exhaust line, in particular of an automobile vehicle, said device comprising: at least one axially extending flexible conduit element interposed between said members of said line for interconnecting said members; fastening elements, fixed to opposite ends of said at least one flexible conduit element, for fastening together said members; and means for damping relative displacement of said ends of said at least one flexible conduit element and therefore of said members of said line; said damping means being evenly arranged about said at least one flexible conduit element and interposed between said fastening elements, each of said damping means comprising at least one deformable coil of metallic cable for damping relative displacements of said fastening elements and for avoiding the transmission of vibrations along the exhaust line, said coil being fixed to said fastening elements.

2. Device according to claim 1, wherein said fastening elements extend in confronting relation to each other in general directions substantially perpendicular to the axis of said at least one flexible conduit element.

3. Device according to claim 1, comprising at least one damping means disposed on each side of said at least one flexible conduit element.

4. Device according to claim 1, wherein each damping means comprises a plurality of coils of metallic cable.

5. Device according to claim 1, comprising fixing clamps fixing said at least one coil of metallic cable to said fastening elements.

6. Device for articulately interconnecting members of an exhaust line, in particular of an automobile vehicle, said device comprising: at least one axially extending flexible conduit element interposed between said members of said line for interconnecting said members; fastening elements, fixed to opposite ends of said at least one flexible conduit element for fastening together said members; and means for damping relative displacement of said ends of said at least one flexible conduit element and therefore of said members of said line; said damping means being evenly arranged about said at least one flexible conduit element and interposed between said fastening elements, each of said damping means comprising at least one coil of metallic cable, said coil being fixed to said fastening elements;

wherein said fastening elements extend one over the other in general directions substantially parallel to the axis of said at least one flexible conduit element.

7. The device according to claim 6, further comprising at least one said damping means disposed on each side of said at least one flexible conduit element.

8. The device according to claim 6, wherein each damping means comprises a plurality of coils of metallic cable.

9. The device according to claim 6, further comprising fixing clamps fixing said at least one coil of metallic cable to said fastening elements.

10. Device for articulately interconnecting members of an exhaust line, in particular of an automobile vehicle, said device comprising: at least one axially extending flexible conduit element interposed between said members of said line for interconnecting said members; fastening elements, fixed to opposite ends of said at least one flexible conduit element for fastening together said members; and means for damping relative displacement of said ends of said at least one flexible conduit element and therefore of said members of said line; said damping means being evenly arranged about said at least one flexible conduit element and interposed between said fastening elements, each of said damping means comprising at least one coil of metallic cable, said coil being fixed to said fastening elements;

said device comprising four said damping means disposed in pairs on each side of said at least one flexible conduit element.

11. The device according to claim 10, wherein said fastening elements extend in confronting relation to each other in general directions substantially perpendicular to the axis of said at least one flexible conduit element.

12. The device according to claim 10, wherein each damping means comprises a plurality of coils of metallic cable.

13. The device according to claim 10, further comprising fixing clamps fixing said at least one coil of metallic cable to said fastening elements.

* * * * *